United States Patent
Seo et al.

(10) Patent No.: US 7,664,372 B2
(45) Date of Patent: Feb. 16, 2010

(54) RECORDING MEDIUM HAVING DATA STRUCTURE FOR MANAGING REPRODUCTION OF MULTIPLE COMPONENT DATA RECORDED THEREON AND RECORDING AND REPRODUCING METHODS AND APPARATUSES

(75) Inventors: Kang Soo Seo, Kyunggi-do (KR); Byung Jin Kim, Kyunggi-do (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1070 days.

(21) Appl. No.: 10/715,461

(22) Filed: Nov. 19, 2003

(65) Prior Publication Data

US 2004/0101285 A1    May 27, 2004

(30) Foreign Application Priority Data

Nov. 20, 2002   (KR) .................. 10-2002-072517

(51) Int. Cl.
*H04N 7/52* (2006.01)

(52) U.S. Cl. .................... 386/95; 386/36; 386/37; 386/124; 386/92; 386/125; 386/126

(58) Field of Classification Search ......... 386/111–112, 386/124–126, 95, 46, 36–37, 9
See application file for complete search history.

(56) References Cited

U.S. PATENT DOCUMENTS

| | | |
|---|---|---|
| 5,521,898 A | 5/1996 | Ogasawara |
| 5,559,808 A | 9/1996 | Kostreski et al. |
| 5,602,956 A | 2/1997 | Suzuki et al. |
| 5,651,010 A | 7/1997 | Kostreski et al. |
| 5,691,972 A | 11/1997 | Tsuga et al. |
| 5,729,549 A | 3/1998 | Kostreski et al. |
| 5,732,185 A | 3/1998 | Hirayama et al. |
| 5,742,569 A | 4/1998 | Yamamoto et al. |
| 5,747,136 A | 5/1998 | Shono et al. |
| 5,771,334 A | 6/1998 | Yamauchi et al. |
| 5,784,528 A | 7/1998 | Yamane et al. |
| 5,819,003 A | 10/1998 | Hirayama et al. |
| 5,835,493 A | 11/1998 | Magee et al. |

(Continued)

FOREIGN PATENT DOCUMENTS

CN    1134583    10/1996

(Continued)

OTHER PUBLICATIONS

Office Action for corresponding Chinese application dated Dec. 14, 2007 and English translation thereof.

(Continued)

*Primary Examiner*—Thai Tran
*Assistant Examiner*—Helen Shibru
(74) *Attorney, Agent, or Firm*—Harness, Dickey & Pierce, PLC

(57) ABSTRACT

The recording medium has a data area with at least one clip file of main component data and at least one clip file of auxiliary component data stored therein, the clip file of main component data and the clip file of auxiliary component data being separate clip files that are non-interleaved on the recording medium.

32 Claims, 8 Drawing Sheets

U.S. PATENT DOCUMENTS

| | | |
|---|---|---|
| 5,854,873 A | 12/1998 | Mori et al. |
| 5,870,523 A | 2/1999 | Kikuchi et al. |
| 5,877,817 A | 3/1999 | Moon |
| 5,884,004 A | 3/1999 | Sato et al. |
| 5,909,257 A | 6/1999 | Ohishi et al. |
| 5,913,010 A | 6/1999 | Kaneshige et al. |
| 5,940,255 A | 8/1999 | Uwabo et al. |
| 5,949,792 A | 9/1999 | Yasuda et al. |
| 5,953,187 A | 9/1999 | Uwabo et al. |
| 5,987,126 A | 11/1999 | Okuyama et al. |
| 5,999,698 A | 12/1999 | Nakai et al. |
| 6,031,962 A | 2/2000 | Sawabe et al. |
| 6,035,095 A | 3/2000 | Kaneshige et al. |
| 6,064,796 A | 5/2000 | Nakamura et al. |
| 6,067,400 A | 5/2000 | Saeki et al. |
| 6,167,189 A | 12/2000 | Taira et al. |
| 6,181,870 B1 | 1/2001 | Okada et al. |
| 6,181,872 B1 | 1/2001 | Yamane et al. |
| 6,195,726 B1 | 2/2001 | Hogan |
| 6,219,488 B1 | 4/2001 | Mori et al. |
| 6,222,805 B1 | 4/2001 | Mori et al. |
| 6,285,825 B1 | 9/2001 | Miwa et al. |
| 6,321,027 B2 | 11/2001 | Honjo |
| 6,336,002 B1 | 1/2002 | Yamauchi et al. |
| 6,343,062 B1 | 1/2002 | Furukawa et al. |
| 6,351,442 B1 | 2/2002 | Tagawa et al. |
| 6,353,613 B1 | 3/2002 | Kubota et al. |
| 6,360,055 B1 | 3/2002 | Kaneshige et al. |
| 6,377,747 B1 | 4/2002 | Murase et al. |
| 6,385,388 B1 | 5/2002 | Lewis et al. |
| 6,385,389 B1 | 5/2002 | Maruyama et al. |
| 6,385,394 B1 | 5/2002 | Okada et al. |
| 6,385,398 B1 | 5/2002 | Matsumoto |
| 6,393,574 B1 | 5/2002 | Kashiwagi et al. |
| 6,415,101 B1 | 7/2002 | DeCarmo et al. |
| 6,424,797 B1 | 7/2002 | Murase et al. |
| 6,445,872 B1 | 9/2002 | Sano et al. |
| 6,470,140 B1 | 10/2002 | Sugimoto et al. |
| 6,470,460 B1 | 10/2002 | Kashiwagi et al. |
| 6,504,996 B1 | 1/2003 | Na et al. |
| 6,546,195 B2 | 4/2003 | Kashiwagi et al. |
| 6,556,774 B2 | 4/2003 | Tsumagari et al. |
| 6,564,006 B1 | 5/2003 | Mori et al. |
| 6,567,608 B2 | 5/2003 | Mori et al. |
| 6,573,819 B1 | 6/2003 | Oshima et al. |
| 6,584,277 B2 | 6/2003 | Tsumagari et al. |
| 6,603,517 B1 | 8/2003 | Shen et al. |
| 6,618,396 B1 | 9/2003 | Kondo et al. |
| 6,654,543 B2 | 11/2003 | Ando et al. |
| 6,788,883 B1 | 9/2004 | Park et al. |
| 6,801,713 B1 | 10/2004 | Yagawa et al. |
| 6,901,078 B2 | 5/2005 | Morris |
| 6,904,227 B1 | 6/2005 | Yamamoto et al. |
| 7,024,102 B1 | 4/2006 | Inoshita et al. |
| 7,072,573 B2 | 7/2006 | Okada et al. |
| 7,106,946 B1 | 9/2006 | Kato |
| 7,124,303 B2 | 10/2006 | Candelore et al. |
| 7,236,687 B2 | 6/2007 | Kato et al. |
| 2001/0033517 A1 | 10/2001 | Ando et al. |
| 2001/0038745 A1 | 11/2001 | Sugimoto et al. |
| 2001/0043790 A1* | 11/2001 | Saeki et al. .................... 386/65 |
| 2001/0053280 A1 | 12/2001 | Yamauchi et al. |
| 2002/0015383 A1 | 2/2002 | Ueno |
| 2002/0015581 A1 | 2/2002 | Ando et al. |
| 2002/0021761 A1 | 2/2002 | Zhang et al. |
| 2002/0031336 A1 | 3/2002 | Okada et al. |
| 2002/0044757 A1* | 4/2002 | Kawamura et al. ............ 386/46 |
| 2002/0046328 A1 | 4/2002 | Okada |
| 2002/0076201 A1 | 6/2002 | Tsumagari et al. |
| 2002/0097981 A1 | 7/2002 | Seo et al. |
| 2002/0097984 A1 | 7/2002 | Abecassis |
| 2002/0106196 A1* | 8/2002 | Yamauchi et al. ............. 386/95 |
| 2002/0127002 A1 | 9/2002 | Mori et al. |
| 2002/0145702 A1 | 10/2002 | Kato et al. |
| 2002/0159368 A1 | 10/2002 | Noda et al. |
| 2002/0180803 A1 | 12/2002 | Kaplan et al. |
| 2002/0196365 A1 | 12/2002 | Cho et al. |
| 2002/0197059 A1 | 12/2002 | Cho et al. |
| 2003/0002194 A1 | 1/2003 | Andoh |
| 2003/0026597 A1 | 2/2003 | Cho et al. |
| 2003/0118327 A1 | 6/2003 | Um et al. |
| 2003/0123849 A1 | 7/2003 | Nallur et al. |
| 2003/0133509 A1 | 7/2003 | Yanagihara et al. |
| 2003/0161615 A1 | 8/2003 | Tsumagari et al. |
| 2003/0221055 A1 | 11/2003 | Okada |
| 2003/0235403 A1 | 12/2003 | Seo et al. |
| 2003/0235404 A1 | 12/2003 | Seo et al. |
| 2004/0086261 A1 | 5/2004 | Hanes |
| 2004/0156621 A1 | 8/2004 | Seo et al. |
| 2004/0179819 A1 | 9/2004 | Cho et al. |
| 2004/0179820 A1 | 9/2004 | Kashiwagi et al. |
| 2004/0179827 A1 | 9/2004 | Cho et al. |
| 2004/0247290 A1 | 12/2004 | Seo et al. |
| 2004/0252975 A1 | 12/2004 | Cho et al. |
| 2005/0025459 A1 | 2/2005 | Kato et al. |
| 2005/0036763 A1 | 2/2005 | Kato et al. |
| 2005/0254363 A1* | 11/2005 | Hamada et al. ............. 369/47.1 |
| 2006/0222340 A1 | 10/2006 | Yamauchi et al. |
| 2008/0019675 A1* | 1/2008 | Hamasaka et al. .......... 386/124 |

FOREIGN PATENT DOCUMENTS

| | | |
|---|---|---|
| CN | 1150293 | 5/1997 |
| CN | 1163673 | 10/1997 |
| CN | 1197573 | 10/1998 |
| CN | 1197574 | 10/1998 |
| CN | 1220458 | 6/1999 |
| CN | 1237852 | 12/1999 |
| CN | 1251461 | 4/2000 |
| CN | 1251680 | 4/2000 |
| CN | 1272209 | 11/2000 |
| CN | 1317200 | 10/2001 |
| EP | 0723216 | 7/1996 |
| EP | 0737980 | 10/1996 |
| EP | 0836183 | 4/1998 |
| EP | 0836189 | 4/1998 |
| EP | 0847198 | 6/1998 |
| EP | 0873022 | 10/1998 |
| EP | 0896337 | 2/1999 |
| EP | 0917355 | 5/1999 |
| EP | 1126454 | 8/1999 |
| EP | 0940983 | 9/1999 |
| EP | 0967604 | 12/1999 |
| EP | 1003338 | 5/2000 |
| EP | 0918438 | 8/2001 |
| EP | 1198132 | 4/2002 |
| EP | 1198133 | 4/2002 |
| EP | 1043724 A1 | 10/2002 |
| EP | 1256954 | 11/2002 |
| EP | 1202568 | 7/2003 |
| EP | 0920203 | 9/2004 |
| EP | 1081885 | 3/2005 |
| JP | 01-003781 | 1/1989 |
| JP | 01-116819 | 5/1989 |
| JP | 11-66813 A | 6/1989 |
| JP | 08-088832 | 4/1996 |
| JP | 08-235833 | 9/1996 |
| JP | 09-023403 | 1/1997 |
| JP | 09-251759 | 9/1997 |
| JP | 10-032780 | 2/1998 |
| JP | 10-040667 | 2/1998 |
| JP | 10-51737 | 2/1998 |
| JP | 10-269698 | 10/1998 |
| JP | 10-271449 | 10/1998 |

| | | |
|---|---|---|
| JP | 10-299698 | 10/1998 |
| JP | 11-41563 | 2/1999 |
| JP | 11-103444 | 4/1999 |
| JP | 11-134812 | 5/1999 |
| JP | 11-185463 | 7/1999 |
| JP | 11-259976 | 9/1999 |
| JP | 11-346341 | 12/1999 |
| JP | 2000-30414 | 1/2000 |
| JP | 2000-041066 | 2/2000 |
| JP | 2000-069437 | 3/2000 |
| JP | 2000-113602 | 4/2000 |
| JP | 2000-149514 | 5/2000 |
| JP | 2000-235779 | 8/2000 |
| JP | 2000-293938 | 10/2000 |
| JP | 2000-299836 | 10/2000 |
| JP | 2000-348442 | 12/2000 |
| JP | 2001-24973 | 1/2001 |
| JP | 2001-24985 A | 1/2001 |
| JP | 2001-111944 | 1/2001 |
| JP | 2001-67802 | 3/2001 |
| JP | 2001-111929 | 4/2001 |
| JP | 2001-111960 | 4/2001 |
| JP | 2001-169246 | 6/2001 |
| JP | 2001-297535 | 10/2001 |
| JP | 2002-83486 A | 3/2002 |
| JP | 2002-112179 | 4/2002 |
| JP | 2002-150685 | 5/2002 |
| JP | 2002-158972 | 5/2002 |
| JP | 2002-158974 A | 5/2002 |
| JP | 2002-176623 A | 6/2002 |
| JP | 2002-216460 | 8/2002 |
| JP | 2002-222581 | 8/2002 |
| JP | 2003-087744 | 3/2003 |
| JP | 2003-116100 | 4/2003 |
| JP | 2006-503400 | 1/2006 |
| KR | 1999-022858 | 3/1999 |
| KR | 10-2000-0031861 | 6/2000 |
| KR | 10-2000-0055028 | 9/2000 |
| KR | 10-2000-0056179 | 9/2000 |
| KR | 10-2000-0065876 | 11/2000 |
| KR | 10-2001-0022702 | 3/2001 |
| KR | 10-0294884 | 4/2001 |
| KR | 10-2001-0098007 | 11/2001 |
| KR | 10-2001-0098101 | 11/2001 |
| KR | 10-2001-0107578 | 12/2001 |
| KR | 10-2002-0006674 | 1/2002 |
| KR | 10-2002-0020919 | 3/2002 |
| KR | 10-2002-0097454 | 12/2002 |
| KR | 10-2002-0097455 | 12/2002 |
| KR | 10-2004-0000290 | 1/2004 |
| KR | 10-2004-0030992 | 4/2004 |
| KR | 10-2004-0030994 | 4/2004 |
| KR | 10-2004-0030995 | 4/2004 |
| KR | 10-2004-0041581 | 5/2004 |
| TW | 391548 | 5/2000 |
| WO | WO 97/13365 | 4/1997 |
| WO | WO 97/13366 | 4/1997 |
| WO | WO 98/00952 | 1/1998 |
| WO | WO 99/08281 | 2/1999 |
| WO | WO 00/02195 A2 | 1/2000 |
| WO | WO 2004/001748 A1 | 1/2000 |
| WO | WO 00/42515 | 7/2000 |
| WO | WO 00/62295 | 10/2000 |
| WO | WO 01/80239 | 10/2001 |
| WO | WO 01/82604 | 11/2001 |
| WO | WO 01/82606 | 11/2001 |
| WO | WO 01/82609 | 11/2001 |
| WO | WO 01/82610 | 11/2001 |
| WO | WO 04/001750 | 12/2003 |
| WO | WO 2004/001753 | 12/2003 |
| WO | WO 2004/045206 | 5/2004 |
| WO | WO 2004-075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |

OTHER PUBLICATIONS

International Search Report, dated Mar. 10, 2004.
Office Action dated Apr. 22, 2008 for corresponding Japanese Application No. 2006-196199 and English translation thereof.
Office Action for corresponding Japanese application dated May 20, 2008.
United States Office Action dated Jul. 9, 2008.
Japanese Patent Office Action dated May 7, 2008, for corresponding Japanese Patent Application No. 2004-517368 (2 pp.).
Japanese Patent Office Action dated May 7, 2008, for corresponding Japanese Patent Application No. 2004-517390 (3 pp.).
European Patent Office Action dated Mar. 31, 2008, for corresponding European Patent Application No. 037611863.1-2223 (3 pp.).
European Search Report dated Aug. 13, 2008.
Chinese Office Action dated Dec. 14, 2007.
Japanese Office Action dated Jan. 22, 2008.
European Search Report dated Dec. 28, 2007.
European Search Report dated Jan. 2, 2008.
United States Office Action dated Jan. 2, 2008.
United States Office Action dated Jan. 28, 2008.
Chinese Office Action dated Mar. 7, 2008.
United States Office Action dated Apr. 2, 2008.
United States Office Action dated Mar. 21, 2008.
Chinese Office Action dated Feb. 1, 2008.
European Search Report dated Jun. 12, 2009.

* cited by examiner

RECORDING MEDIUM HAVING DATA STRUCTURE FOR MANAGING REPRODUCTION OF MULTIPLE COMPONENT DATA RECORDED THEREON AND RECORDING AND REPRODUCING METHODS AND APPARATUSES

FOREIGN PRIORITY

The present invention claims priority under 35 U.S.C. 119 on Korean Application No. 10-2002-0072517 filed Nov. 20, 2002; the contents of which are incorporated by reference in their entirety.

BACKGROUND OF THE INVENTION

1. Field of the Invention

The present invention relates to a recording medium having a data structure for managing reproduction of multiple component data recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RE) is one example of these new optical disks.

FIG. 1 illustrates the file structure of the BD-RE. The file structure or data structure provides for managing the reproduction of the video and audio data recorded on the BD-RE. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RE data structure and disk format as illustrated in FIG. 1 is well-known and readily available, only a brief overview of the file structure will be provided in this disclosure.

As alluded to above, the STREAM directory includes MPEG2-formatted A/V stream files called clips or clip files. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the file names of the playlist in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

In the BD-RE standard, video data, audio data, and subtitle data are multiplexed together on a transport packet basis in the same clip file. As a result, it is difficult to deal with just one component of this clip of multiple component data. The video data is generally the main component data, and it may be desired to change or replace one of the auxiliary component data such as the audio data. For example, it may be desired to replace the audio data component that provides Korean language for a movie represented by the video data component with a different audio data component that provides English language for the movie. Because the audio data is recorded with the video data in the same clip file, this replacement can not take place.

The standardization for high-density read-only optical disks such as the Blu-ray ROM (BD-ROM) is still under way. An effective data structure for managing multiple component data recorded on the high-density read-only optical disk such as a BD-ROM is not yet available.

SUMMARY OF THE INVENTION

The recording medium according to the present invention includes a data structure for managing multiple component data.

In one exemplary embodiment, the recording medium includes multiple component data with each component stored in a different file. As such, each component may be dealt with independently. In one exemplary embodiment, each clip file includes data of one of the multiple components. For example, one clip file includes video data, and at least one other clip file includes auxiliary data. The auxiliary data may be audio data, subtitle data, enhanced data, etc. Examples of enhanced data include html data, Java data, CGI data, xml data, etc.

In one exemplary embodiment, each clip file is divided into units of data, and each unit of data includes one or more entry points. The number of entry points forming a unit of data may be fixed or variable for a clip file. Furthermore, the units of data from different clip files are not interleaved.

The present invention further provides apparatuses and methods for recording and reproducing the data structure according to the present invention.

BRIEF DESCRIPTION OF THE DRAWINGS

The above features and other advantages of the present invention will be more clearly understood from the following detailed description taken in conjunction with the accompanying drawings, in which.

DESCRIPTION OF THE PREFERRED EMBODIMENTS

In order that the invention may be fully understood, exemplary embodiments thereof will now be described with reference to the accompanying drawings.

Figure 1:
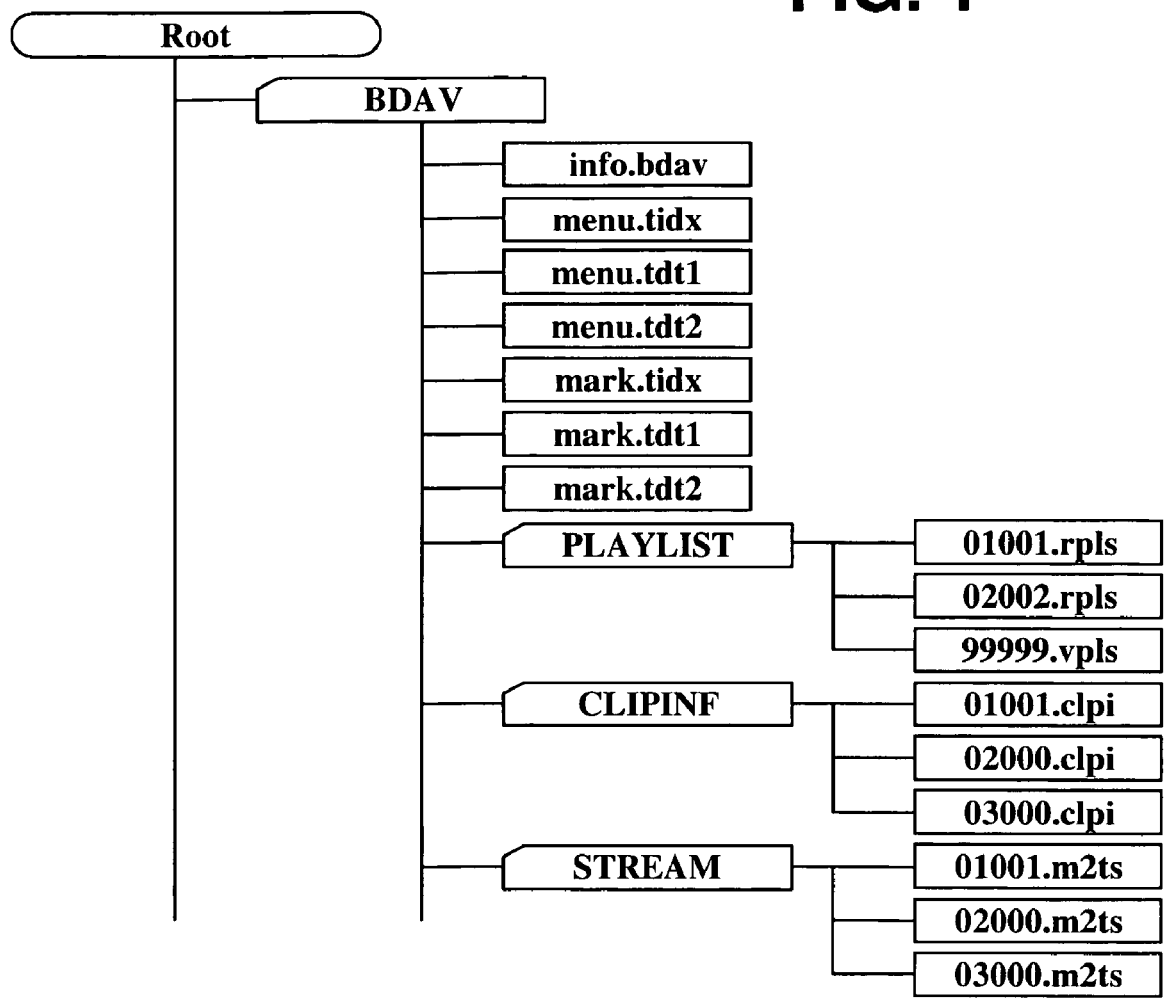
FIG. 1 illustrates the prior art file or data structure of a rewritable optical disk according to the Blu-ray Disc Rewritable (BD-RE) standard.
Figure 2:
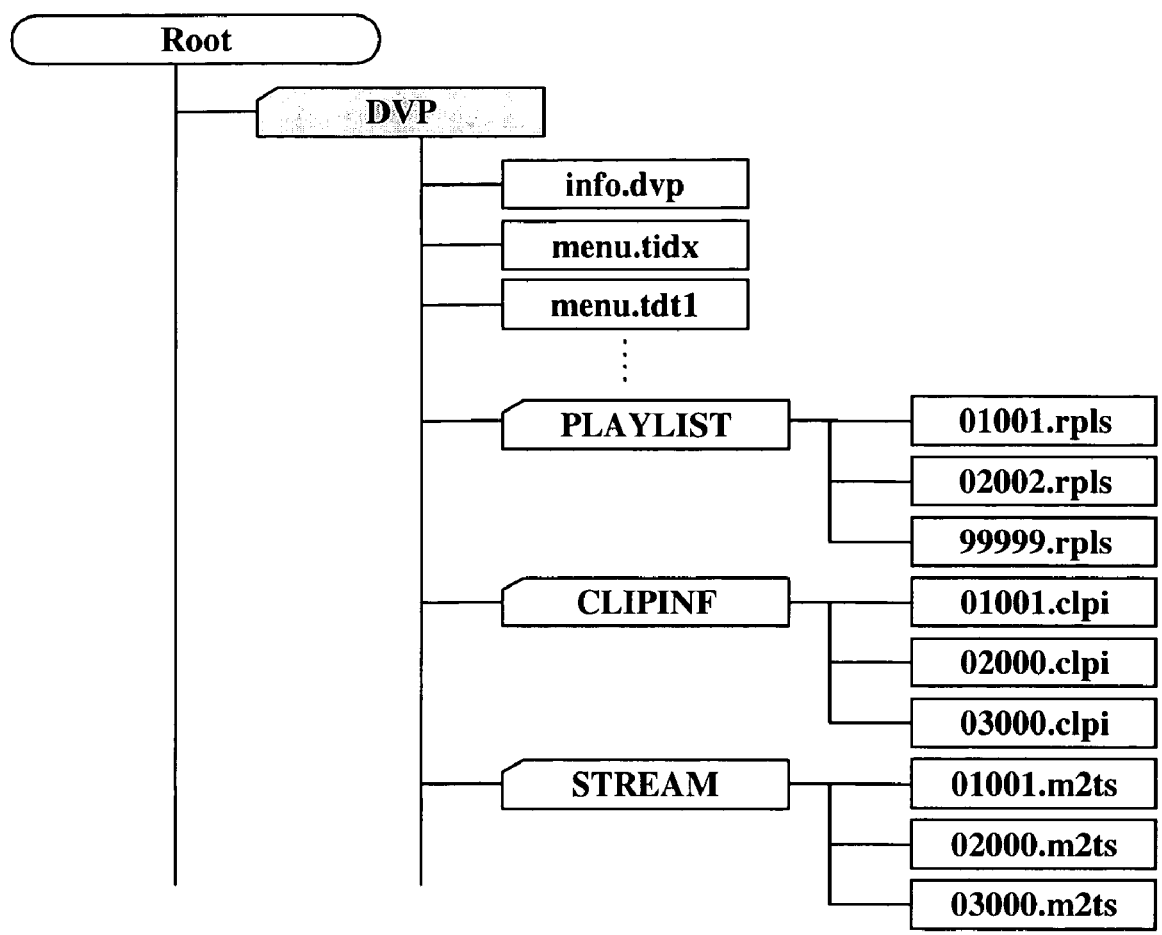
FIG. 2 illustrates an exemplary embodiment of a recording medium file or data structure according to the present invention.

A high-density recording medium such as a high density optical disk, for example, a Blu-Ray ROM (BD-ROM), BD-RE, etc. in accordance with the invention may have a file or data structure for managing reproduction of video and audio data as shown in FIG. 2. Many aspects of the data structure according to the present invention shown in FIG. 2 are similar to that of the BD-RE standard discussed with respect to FIG. 1. As such these aspects will not be described in great detail.

As shown in FIG. 2, the root directory contains at least one DVP directory. The DVP directory includes a general information file info.dvp, menu files menu.tidx, menu.tdt1 among others, a PLAYLIST directory in which playlist files (e.g., real (*.rpls) and virtual (*.vpls)) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips or clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet, and packets between entry points provided in the EP map are collectively referred to as an entry point.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

The info.dvp file is a general information file that provides general information for managing the reproduction of the A/V streams recorded on the optical disk. More specifically, the info.dvp file includes, among other things, a table of playlists that identifies the file names of the playlists in the PLAYLIST directory. The info.dvp file will be discussed in greater detail below with respect to the embodiments of the present invention.

Figure 3:
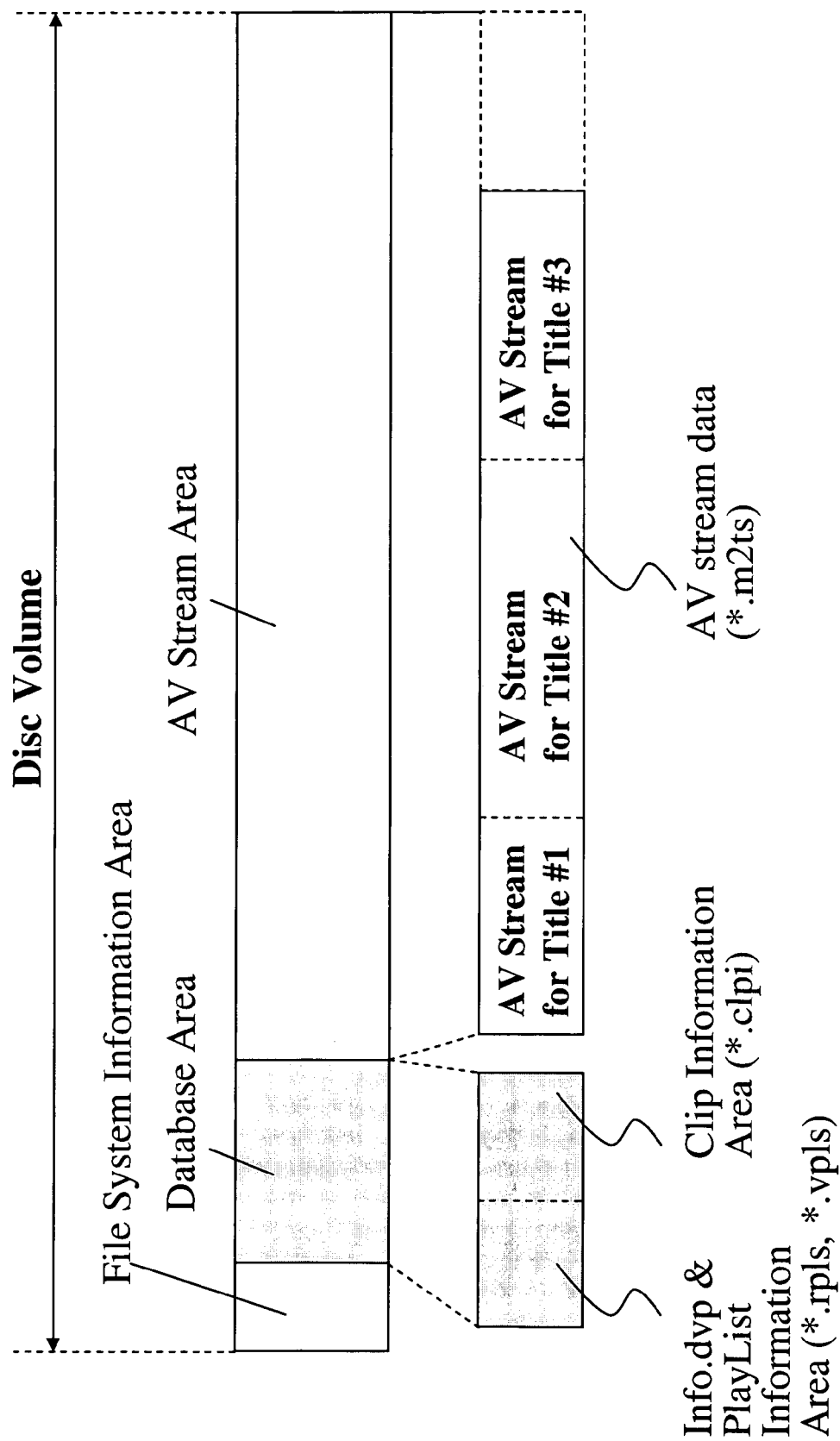
FIG. 3 illustrates an example of a recording medium having the data structure of FIG. 2 stored thereon.

In addition to illustrating the data structure of the recording medium according to an embodiment of the present invention, FIG. 2 represents the areas of the recording medium. For example, the general information file is recorded in one or more general information areas, the playlist directory is recorded in one or more playlist directory areas, each playlist in a playlist directory is recorded in one or more playlist areas of the recording medium, etc. FIG. 3 illustrates an example of a recording medium having the data structure of FIG. 2 stored thereon. As shown, the recording medium includes a file system information area, a data base area and an A/V stream area. The data base area includes a general information file and playlist information area and a clip information area. The general information file and playlist information area have the general information-file recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data. It will be appreciated that the above examples of multiple reproduction path video data are not limiting, and the present invention is applicable to any type or combination of types of multiple reproduction path video data.

As alluded to above, the data recorded on a high density recording medium such as high density optical disk (e.g., BD-ROM) includes multiple component data. Typically video data is the main component data, with the other component data being characterized as auxiliary component data. The auxiliary component data may be audio data, graphic data (e.g., subtitle data, graphics, etc.). The embodiments of the present invention further consider enhanced data as auxiliary component data. Enhanced data includes newer forms of data such as Java data, html data, xml data, CGI data, etc.

As will be described in detail below, the embodiments of the present invention provide a recording medium with a data structure for managing reproduction of multiple component data recorded on the recording medium. The embodiments of the present invention further provide methods and apparatuses for recording and reproducing the described data structure.

Figure 4:
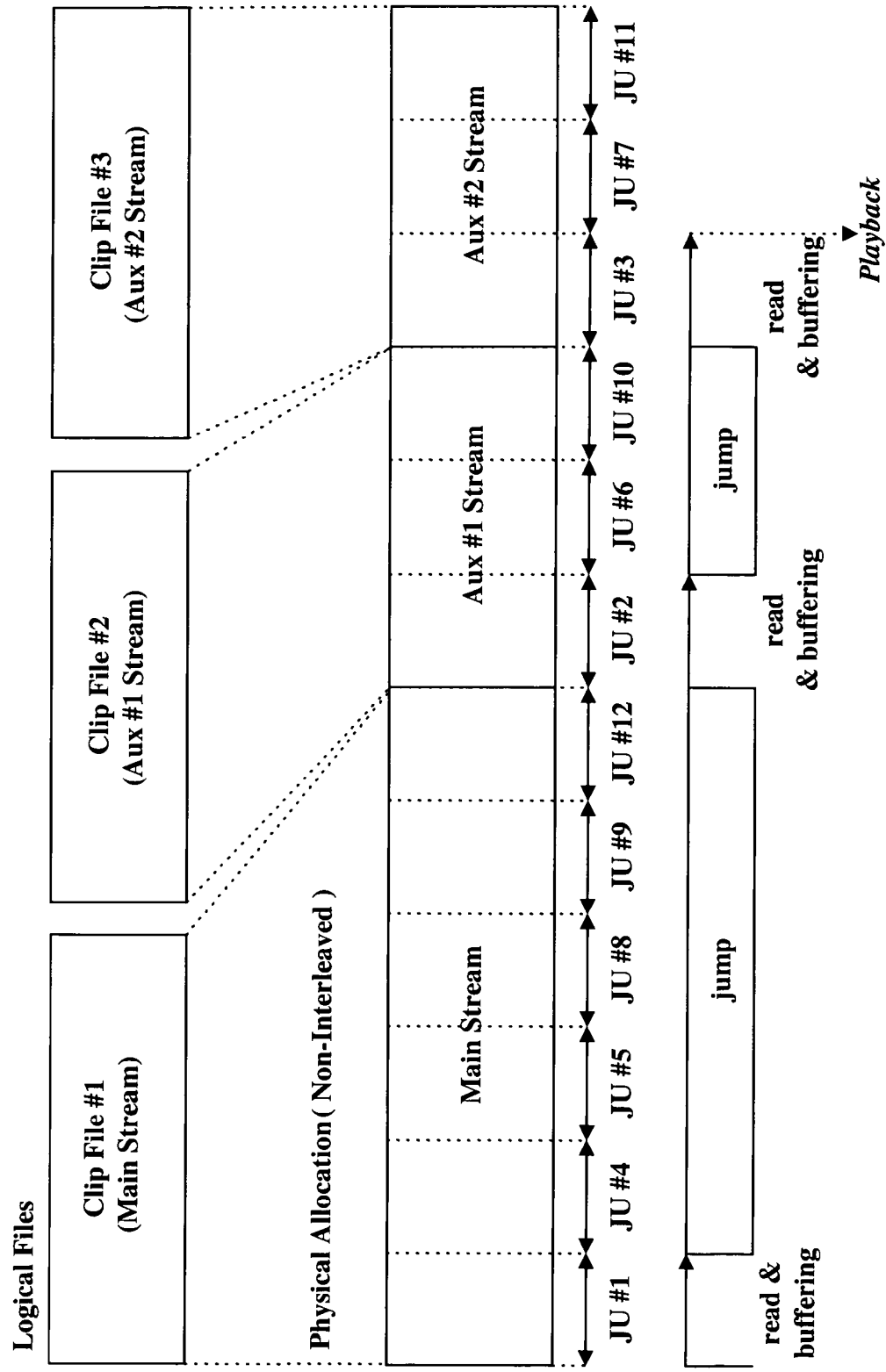
FIG. 4 illustrates an embodiment of the data structure associated with managing multiple component data for use in the data structure according to FIG. 2.

FIG. 4 illustrates a first embodiment of managing multiple component data according to the present invention. In this embodiment, a main component stream and each auxiliary component stream are managed separately as multiple clip files. In the example of FIG. 4, the main component stream such as a video stream is managed as a first clip file Clip File #1. A first auxiliary component stream such as audio data is managed as a second clip file Clip File #2, and a third auxiliary component stream such as html data is managed as a third clip file Clip File #3.

The first, second and third clip files Clip Files #1, #2, #3 are recorded in a data recording area of the recording medium (e.g., a BD-ROM) without interleaving. For example, as shown in FIG. 4, the data in each of the first-third clip files Clip Files #1, #2, #3 are divided into units of data referred to as jumping units (JUs), and the jumping units in each of the of the first-third clip files Clip Files #1, #2, #3 are recorded without being interleaved. Namely, each of the first-third clip files Clip Files #1, #2, #3 forms a separate block of data on the recording medium. As such, the different component data streams may be managed independently of one another.

Even though the different component data streams may be managed separately, the portions of the different component data streams may be intended for reproduction in conjunction with one another. As shown in FIG. 4, the data structure of this embodiment manages the reproduction of the different component data steams on a jumping unit basis. Namely, each jumping unit includes a jumping unit identifier. The jumping unit identifiers indicate an order that the a reproducing apparatus should reproduce the jumping units so that if desired, jumping units of data for different component data streams may be reproduced in conjunction with one another (e.g., simultaneously).

As shown in FIG. 4, the first clip file Clip File #1 includes jumping units with jumping unit identifiers JU#1, JU#4, JU#5, JU#8, JU#9 and JU#12. The second clip file Clip File #2 includes jumping units with jumping unit identifiers JU#2, JU#6 and JU#10; and the third clip file Clip File #3 includes jumping units with jumping unit identifiers JU#3, JU#7 and JU#11. During reproduction, the reproducing apparatus (e.g., an optical disk reproducing apparatus such as described in detail below) reads out the video data of the main component stream corresponding to a first jumping unit JU #1 and stores this data in a buffer. The reproducing apparatus then searches for and reads out the next jumping unit JU#2 in the sequence. Accordingly, the reproducing apparatus reads out the audio data of the first auxiliary component in the second jumping unit JU #2, and stores this data in a respective buffer. This operation then repeats such that the html data of the second auxiliary component stream in the third jumping unit JU #3 is read out and stored in a respective buffer.

The reproducing apparatus then plays the video data together with the audio and html data. This same procedure then repeats for the subsequent jumping units of data in the main and auxiliary component streams.

Figure 5:
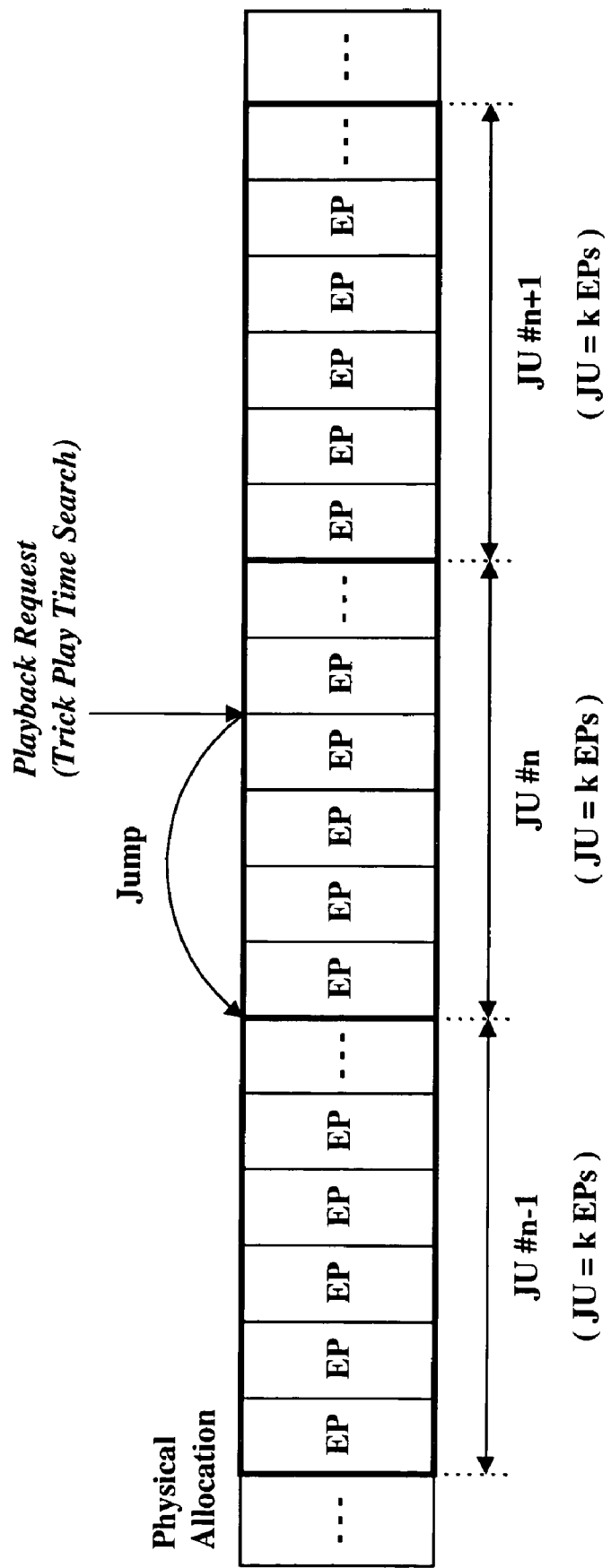
FIG. 5 illustrates one embodiment of the structure of the jumping units in FIG. 4.
Figure 6:
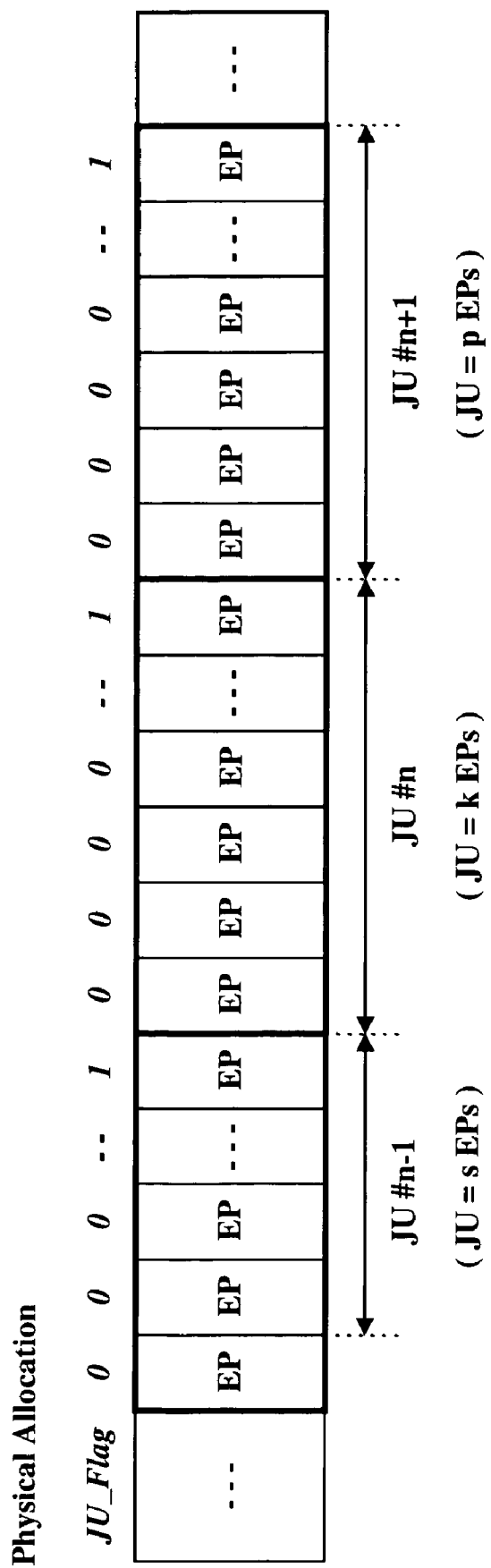
FIG. 6 illustrates another embodiment of the structure of the jumping units in FIG. 4.

FIG. 5 illustrates one embodiment of the structure of the jumping units in FIG. 4. As shown, each jumping unit is divided into a number of entry points (EPs), which are referenced in an EP map of an associated clip information file. In the embodiment of FIG. 5, each jumping unit JU is formed of a same number 'k' of entry points. However, as shown in FIG. 6 described below, the present invention is not limited to having jumping units with the same number of entry points. Instead each jumping unit may have the same or a different number of entry points. Furthermore, the clip files may differ in that one has jumping units with the same number of entry points and another has jumping units with different numbers of entry points.

Each entry point included in each jumping unit JU may have a variable time length. Accordingly, the time length of each jumping unit JU may be variable. However, in an alternative embodiment, each entry point may have the same fixed time length.

Because the record size of each entry point may be time-varying, so may be the record size of each jumping unit. In an exemplary embodiment, length information about each jumping unit may be recorded in the clip information file associated with the clip file including the jumping unit. The clip information file is used for playback control of the corresponding clip file when accessed by a playlist file, or more specifically a playitem in the playlist file.

In an exemplary embodiment, the lengths of the jumping units are managed in consideration of buffer underflow and overflow problems. For instance, if the length of a jumping unit is too short, buffer underflow may occur during a big jump; moreover, the number of jumping units and associated length information to manage becomes relatively large.

If the length of a jumping unit is excessively long, the size of the buffers for the main and auxiliary component streams increases. For instance, if audio data at 384 kbps amounting to a video stream of a two-hour movie was recorded into a single jumping unit and then buffered, a high capacity buffer of 345 Mbytes would be needed.

FIG. 5 further shows that when a reproducing apparatus is instructed to jump to reproducing different data than that currently reproduced (e.g., such as in response to a trick play request) the jump is to the beginning of an entry point forming the beginning of a jumping unit.

FIG. 6 illustrates another embodiment of the structure of the jumping units in FIG. 4. As shown in FIG. 6, each clip file may be divided into a number of jumping units and each jumping unit JU is formed of a different number of entry points. For example, in one embodiment, each jumping unit corresponds to a chapter. However, as shown in FIG. 5 described above, the present invention is not limited to having jumping units with different numbers of entry points. Instead each jumping unit may have the same or a different number of entry points. Each entry point included in each jumping unit JU may have a variable time length. Accordingly, the time length of each jumping unit JU may be variable. However, in an alternative embodiment, each entry point may have the same fixed time length.

The entry point map in the clip information file associated with each clip file includes a jumping flag J_Flag associated with each entry point. Each jumping flag J_Flag indicates whether a jump to another jumping unit is permitted, and if a jump is permitted, the jumping flag J_Flag implies the point in the clip file where the jump takes place in relation to the entry point.

More specifically, according to one exemplary embodiment of the present invention, a jumping flag "J_Flag=1" indicates a jump is permitted (active jumping flag), and a jumping flag "J_Flag=0" indicates that no jump is permitted (inactive jumping flag). Furthermore, according to one exemplary embodiment, when the jumping flag indicates that a jump is permitted, the jumping flag implies that the change is permitted after reproduction of the entry point with which the jumping flag is associated.

According to another exemplary embodiment of the present invention as shown in FIG. 6, the jumping flags define the boundaries between jumping units. Namely, as shown in FIG. 6, the entry point having an active jumping flag is the last entry point in a jumping unit, and the next entry point is the first entry point in the next jumping unit.

In an alternative embodiment, a jumping flag "J_Flag=1" is recorded in the start entry point of each jumping unit JU, whereas a jumping flag "J_Flag=0" is recorded in the other entry points of each jumping unit JU. In this embodiment, a jump occurs at the point before the entry point with the active jumping flag.

Figure 7:
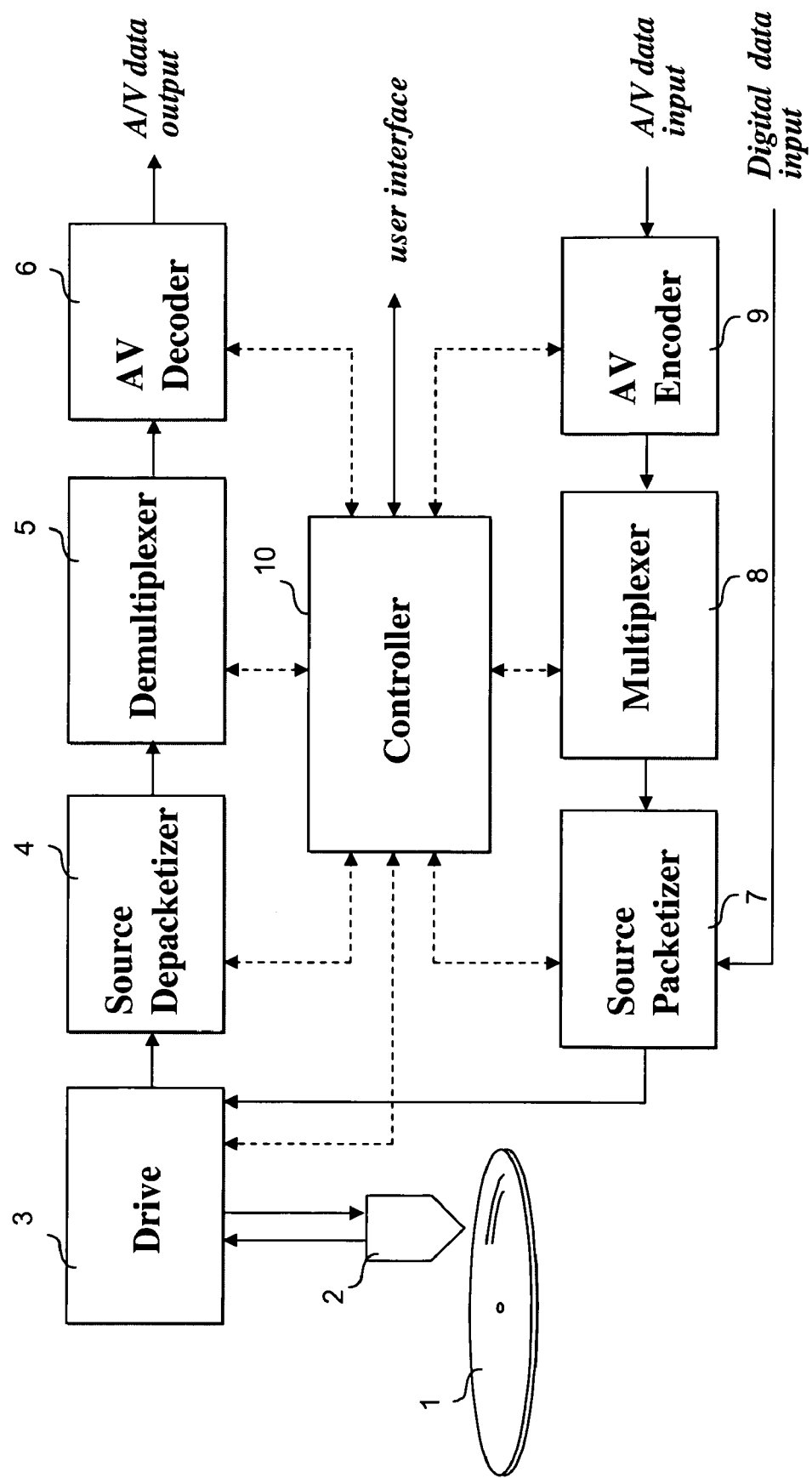
FIG. 7 illustrates a schematic diagram of an embodiment of an optical disk recording and reproduction apparatus of the present invention.

FIG. 7 illustrates a schematic diagram of an embodiment of an optical disk recording and reproducing apparatus according to the present invention. As shown, a data encoder 9 receives and encodes data (e.g., video data, audio data, etc.). The encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the format of the optical disk. As shown in FIG. 7, the operations of the encoder 9, the multiplexer 8 and the source packetizer 7 are controlled by a controller 10. The controller 10 receives user input on the recording operation, and provides control information to encoder 9, multiplexer 8 and the source packetizer 7. For example, the controller 10 instructs the encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and/or management information for managing reproduction of the data being recorded on the optical disk. For example, based on information received via the user interface (e.g., instruction set saved on disk, provided over an intranet or internet by a computer system, etc.) the controller 10 controls the drive 3 to record the data structure of FIGS. 2 and 4 and FIG. 5 or 6 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the audio/video source packets from the optical disk. This user input may be specified, for example, via a menu based graphical user interface preprogrammed into the controller 10.

Based on the data structure of the optical disk, the controller 10 controls the reproduction; namely, jumping between the different component data streams.

The reproduced source packets are received by a source depacketizer 4 and converted into a data stream (e.g., an MPEG-2 transport packet stream). A demultiplexer 5 demultiplexes the data stream into encoded data. A data decoder 6 decodes the encoded data to produce the original data that was feed to the encoder 9. During reproduction, the controller 10 controls the operation of the source depacketizer 4, demultiplexer 5 and decoder 6. The controller 10 receives user input on the reproducing operation, and provides control information to decoder 6, demultiplexer 5 and the source packetizer 4. For example, the controller 10 instructs the decoder 6 on the type of decoding to perform, instructs the demultiplexer 5 on the transport stream to demultiplex, and instructs the source depacketizer 4 on the source packet format.

While FIG. 7 has been described as a recording and reproducing apparatus, it will be understood that only a recording or only a reproducing apparatus may be provided using those portions of FIG. 7 providing the recording or reproducing function.

Figure 8:
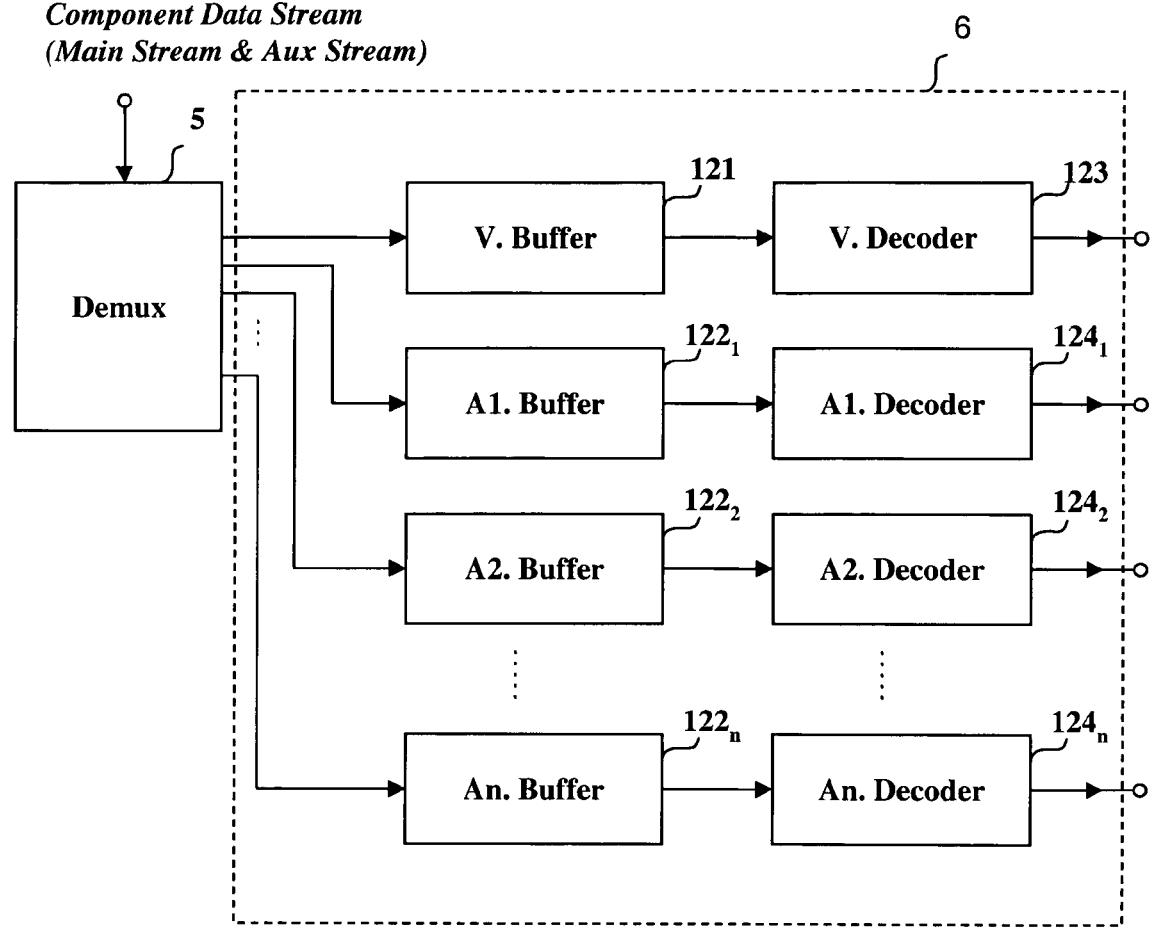
FIG. 8 illustrates a portion of the recording and reproducing apparatus of FIG. 7 in greater detail.

FIG. 8 illustrates a portion of the recording and reproducing apparatus of FIG. 7 in greater detail. Specifically, FIG. 8 illustrates the connection between demultiplexer 5 and decoder 6 in greater detail. FIG. 8 also illustrates the structure of the decoder 6 in greater detail. As shown, the decoder 6 includes a video buffer 121, and more than one auxiliary buffer $122_1$-$122_n$. As described above with respect to the embodiments of the present invention, the demultiplexer 5 provides the different component data to a respective one of the buffers 121 and $122_1$-$122_n$. Namely, video data is provided to the video buffer 121 and the each type of auxiliary data e.g., audio data, html data, Java data, etc.) is provided to a respective one of the auxiliary buffers $122_1$-$122_n$.

The decoder 6 further includes a video decoder 123 and more than one auxiliary decoder $122_1$-$122_n$. The video decoder 123 is associated with the video buffer 121 and decodes the video data stored in the video buffer. Similarly, each of the auxiliary decoders $122_1$-$122_n$ is associated with a respective on of the auxiliary buffers $122_1$-$122_n$, and decodes the respective auxiliary component data stored therein. As described with respect to FIG. 7, the controller 10 controls the operation of the demultiplexer 5 and the decoder 6. Particularly, the controller 10 controls the buffer to which demultiplexed data is stored and the decoding operation performed by the associated decoder. Because the auxiliary component streams may be recorded in different recording formats than the MPEG-2 format of the video component stream, the auxiliary decoders perform decoding operations corresponding to the recording formats of the respective auxiliary component streams as instructed by the controller 10.

Accordingly, the optical disc apparatus may play a main component stream such as a video data stream and various auxiliary component streams in association with one another.

Moreover, while not shown, instead of receiving an auxiliary component stream from the optical disk, the optical disk apparatus may receive an auxiliary component stream through a communications network such as the Internet or an external input. In this case, an optical disc apparatus downloads the auxiliary stream received into one of the auxiliary buffers; and thereafter, the auxiliary stream may be played in conjunction with the main component stream read out and played from the optical disc.

The data length of the auxiliary stream downloaded in this manner may be prescribed to be the same as that of a jumping unit or determined by interface operations between the optical disc apparatus and Internet servers.

As will be appreciated from the forgoing disclosure, a method and an apparatus for managing multi-component data of a high-density optical disc according to the present invention and a high-density optical disc according thereto provide a data structure for efficiently managing multiple component data streams. In particular, the data structure provides for efficiently dealing with a component data stream independent of the other component data streams.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A recording medium storing an executable data structure for managing multiple component data recorded on the recording medium, comprising:

a data area having a first clip file including data packets of a first data stream and a second clip file including data packets of a second data stream, the first clip file and the second clip file being separate clip files, each of the clip files having a plurality of entry points, each of the clip files being associated with a different reproduction path, each of the clip files being divided into a plurality of data units with boundaries between the data units indicating where jumping to a different clip file is permitted; and a management area, the management area storing an entry point map identifying the plurality of entry points of an associated clip file, the entry point map including a plurality of flags, each flag being associated with one of the plurality of entry points and indentifying whether jumping to another clip file is permitted in relation to the one entry point and mapping presentation start time information to a data packet number for the associated clip file.

2. The recording medium of claim 1, wherein the second data stream includes audio data.

3. The recording medium of claim 1, wherein the second data stream includes subtitle data.

4. The recording medium of claim 1, wherein the second data stream includes enhanced data.

5. The recording medium of claim 1, wherein second data stream includes Java data.

6. The recording medium of claim 1, wherein second data stream includes html data.

7. The recording medium of claim 1, wherein second data stream includes xml data.

8. The recording medium of claim 1, wherein second data stream includes CGI data.

9. The recording medium of claim 1, wherein each data unit includes at least one of the plurality of entry points.

10. The recording medium of claim 9, wherein each data unit in a same clip file has a same number of entry points.

11. The recording medium of claim 9, wherein at least two data units in a same clip file have different numbers of entry points.

12. The recording medium of claim 1, wherein each of the entry points define one of the data units in the associated clip file.

13. The recording medium of claim 1, wherein an active flag indicates that jumping is permitted after reproducing the entry point with which the active flag is associated.

14. The recording medium of claim 1, wherein an active flag indicates that jumping is permitted at the entry point with which the active flag is associated.

15. The recording medium of claim 1, wherein the data area has more than one second clip file of the second data stream.

16. The recording medium of claim 15, wherein at least one of the second clip files of the second data stream includes enhanced data.

17. The recording medium of claim 1, wherein the first clip file and the second clip file are non-interleaved.

18. A method of recording a data structure for managing reproduction of multiple component data on a recording medium, the method comprising:

recording a first clip file including data packets of a first data stream and a second clip file including data packets of a second data stream on a data area separate from a management area, the first clip file and the second clip file data being separate clip files, each of the clip files having a plurality of entry points, each of the clip files being associated with a different reproduction path, each of the clip files being divided into a plurality of data units with boundaries between the data units indicating where lumping to a different clip file is permitted; and recording an entry point map in the management area, the an entry point map identifying the plurality of entry points of an associated clip file, the entry point map including a plurality of flags, each flag being associated with one of the plurality of entry points and indentifying whether lumping to another clip file is permitted in relation to the one entry point and mapping presentation start time information to a data packet number for the associated clip file.

19. The method of claim 18, wherein an active flag indicates that jumping is permitted after reproducing the entry point with which the active flag is associated.

20. The method of claim 18, wherein each of the entry points define one of the data units in the associated clip file.

21. The method of claim 18, wherein an active flag indicates that jumping is permitted after reproducing the entry point having with which the active flag is associated.

22. The method of claim 18, wherein the first clip file and the second clip file are non-interleaved.

23. A method of reproducing a data structure for managing reproduction of multiple component data recorded on a recording medium, the method comprising:

reproducing a first clip file including data packets of a first data stream and a second clip file including data packets of a second data stream from a data area separate from a management area, the first clip file and the second clip file being separate clip files, each of the clip files having a plurality of entry points, each of the clip files being associated with a different reproduction path, each of the clip files being divided into a plurality of data units with boundaries between the data units indicating where jumping to a different clip file is permitted; and reproducing an entry point map from the management area, the entry point map identifying the plurality of entry points of an associated clip file, the entry point map including a plurality of flags, each flag being associated with one of the plurality of entry points and indentifying whether lumping to another clip file is permitted in relation to the one entry point and mapping presentation start time information to a data packet number for the associated clip file.

24. The method of claim 23, wherein an active flag indicates that jumping is permitted after reproducing the entry point with which the active flag is associated.

25. The method of claim 23, wherein each of the entry points define one of the data units in the associated clip file.

26. The method of claim 23, wherein the first clip file and the second clip file are non-interleaved.

27. An apparatus for recording a data structure for managing reproduction of multiple component data on a recording medium, comprising:

an optical recording device configured to record data on the computer readable medium;

a controller operably coupled to the optical recording device, the controller configured to control the optical recording device to record a first clip file including data packets of a first data stream and a second clip file including data packets of a second data stream on a data area separate from a management area, the first clip file and the second clip file being separate clip files, each of the clip files having a plurality of entry points, each of the clip files being associated with a different reproduction path, each of the clip files being divided into a plurality of data units with boundaries between the data units indicating where lumping to a different clip file is permitted, and the controller further configured to control the optical recording device to record an entry point map identifying the plurality of entry points of an associated clip file, the entry point map including a plurality of flags, each flag being associated with one of the plurality of entry points and indentifying whether lumping to another clip file is permitted in relation to the one entry point and mapping presentation start time information to a data packet number for the associated clip file.

28. The apparatus of claim 27, wherein each of the entry points define one of the data units in the associated clip file.

29. The apparatus of claim 27, wherein the first clip file and the second clip file are non-interleaved on the recording medium.

30. An apparatus for reproducing a data structure for managing reproduction of multiple component data recorded on a recording medium, comprising:

an optical reproducing device configured to reproduce data recorded on the computer readable medium;

a controller, operably coupled to the optical reproducing device, configured to control the optical reproducing device to reproduce a first clip file including data packets of a first data stream and a second clip file including data packets of a second data stream from a data area separate from a management area, the first clip file and the second clip file being separate clip files, each of the clip files having a plurality of entry points, each of the clip files being associated with a different reproduction path, each of the clip files being divided into a plurality of data units with boundaries between the data units indicating where jumping to a different clip file is permitted, and the controller further configured to control the optical reproducing device to reproduce an entry point map in the management area, the entry point map identifying the plurality of entry points of an associated clip file, the entry point map including a plurality of flags, each flag being associated with one of the plurality of entry points and indentifying whether jumping to another clip file is permitted in relation to the one entry point and mapping presentation start time information to a data packet number for the associated clip file.

31. The apparatus of claim 30, wherein each of the entry points define one of the data units in the associated clip file.

32. The apparatus of claim 30, wherein the first clip file and the second clip file are non-interleaved on the recording medium.

* * * * *

UNITED STATES PATENT AND TRADEMARK OFFICE
CERTIFICATE OF CORRECTION

PATENT NO. : 7,664,372 B2 Page 1 of 1
APPLICATION NO. : 10/715461
DATED : February 16, 2010
INVENTOR(S) : Seo et al.

It is certified that error appears in the above-identified patent and that said Letters Patent is hereby corrected as shown below:

Column 10, line 23, please change "one entry point and mapping presentation start time" to "one entry point, and mapping presentation start time"

Column 11, line 15, please change "to the one entry point and mapping presentation" to "to the one entry point, and mapping presentation"

Column 11, line 47, please change "to the one entry point and mapping presentation" to "to the one entry point, and mapping presentation"

Column 12, line 20, please change "entry point and mapping presentation start time" to "entry point, and mapping presentation start time"

Column 12, line 52, please change "permitted in relation to the one entry point and mapping" to "permitted in relation to the one entry point, and mapping"

Signed and Sealed this

Fourth Day of May, 2010

David J. Kappos
*Director of the United States Patent and Trademark Office*